United States Patent [19]

Avena et al.

[11] 4,047,842
[45] Sept. 13, 1977

[54] VARIABLE PITCH MECHANISM FOR FAN BLADES

[75] Inventors: Salvatore Avena, Newark; Joseph W. Minarick, Oakland, both of N.J.

[73] Assignee: Curtiss-Wright Corporation, Wood-Ridge, N.J.

[21] Appl. No.: 678,156

[22] Filed: Apr. 19, 1976

[51] Int. Cl.² ............................................. B64C 11/32
[52] U.S. Cl. ..................................... 416/152; 416/160
[58] Field of Search ............... 416/152, 160, 167, 162, 416/151; 60/226 R

[56] References Cited

U.S. PATENT DOCUMENTS

| 2,108,660 | 2/1938 | Farrell | 416/152 X |
|---|---|---|---|
| 2,138,339 | 11/1938 | Chauviere | 416/152 |
| 2,314,025 | 3/1943 | Waseige | 416/152 X |
| 2,541,636 | 2/1951 | Chillson | 416/152 |
| 3,866,415 | 2/1975 | Ciokajlo | 60/226 R |
| 3,910,721 | 10/1975 | McMurtry | 416/160 |
| 3,922,852 | 12/1975 | Drabek | 416/160 X |
| 3,994,128 | 11/1976 | Griswold et al. | 416/165 X |

FOREIGN PATENT DOCUMENTS

| 984,485 | 7/1951 | France | 416/152 |
|---|---|---|---|
| 476,646 | 6/1937 | France | 416/152 |
| 880,697 | 6/1953 | Germany | 416/160 |
| 1,173,807 | 7/1964 | Germany | 416/152 |
| 412,434 | 6/1934 | United Kingdom | 416/152 |
| 519,622 | 4/1940 | United Kingdom | 416/160 |

*Primary Examiner*—Everette A. Powell, Jr.
*Attorney, Agent, or Firm*—Arthur Frederick; Victor D. Behn

[57] ABSTRACT

In a variable pitch fan assembly having a plurality of fan blades mounted in a rotor for rotation about their longitudinal axes and a drive shaft for rotatively driving the rotor, the pitch varying mechanism has a planetary gear train connected to each fan blade to rotate the latter to change the pitch or angle of attack of the blades, actuator means for effecting bi-directional rotation of the planetary gear train and a no-back, bi-directional brake interposed between the actuator means and the planetary gear train to transmit pitch-changing rotation from the actuator means to the planetary gear train and lock the planetary gear train to the rotor and prevent transmission of blade torque loads to the actuator means during steady state operation when no blade pitch-change is being effected.

3 Claims, 5 Drawing Figures

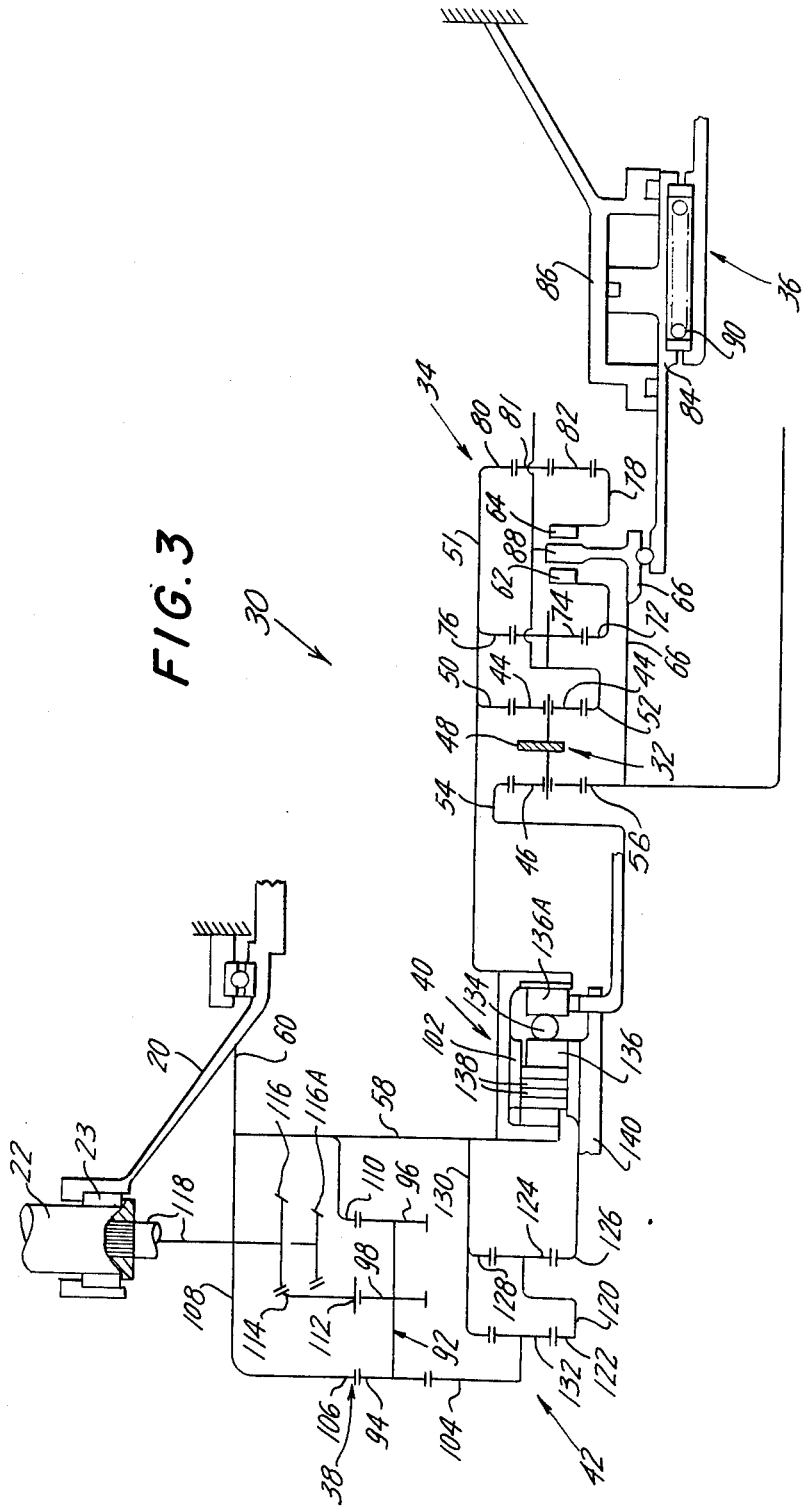

VARIABLE PITCH MECHANISM FOR FAN BLADES

DISCLOSURE OF INVENTION

This invention relates to aircraft engines having variable pitch fans and more specifically to mechanisms for varying the pitch of the fan blades.

BACKGROUND OF INVENTION

A variable pitch fan in this specification means a plurality of circumferentially arranged blades mounted for rotation about one axis and rotatable about their longitudinal axes to vary their angle of attack as they rotate about the one axis.

Variable pitch fan mechanisms which have developed out of the variable pitch propeller technology have suffered from heaviness and complexity and therefore, as exemplified in the U.S. Pat. to McMurtry et at, No. 3,825,370, dated July 23, 1974, effort has been made to develop lighter and simpler variable pitch fan mechanisms. Additionally, heretofore known variable pitch fan mechanisms including the mechanism of the aforementioned patent, have had the disadvantage of recirculating power losses resulting from fan torque load feedback through the pitch-changing gear train during the long periods of steady state operation (no blade pitch-change).

It is, therefore, one of the objects of this invention to provide a variable pitch mechanism for fan blades which is relatively light in weight and relatively simple in construction.

Another object of the present invention is to provide a variable pitch mechanism for fan blades in which recirculating power losses are eliminated.

A still further object of this invention is to provide a variable pitch mechanism for fan blades where the differential gear train of such mechanism runs unloaded during steady state operation.

SUMMARY OF INVENTION

Accordingly, the present invention contemplates a novel variable pitch mechanism for a fan comprising a rotor supported for rotation and driven through a drive shaft by a suitable source of rotary power. The rotor carries a plurality of circumferentially spaced blades each of which is supported for rotative movement about its longitudinal axis to change the pitch or angle of attack of the blades as it is rotationally carried by the rotor. A planetary gear train, having an input gear means and an output gear means, is connected with its output gear engaging gear means associated with the fan blades to effect pitch-changing rotative movement of the blades. An actuator means, including a differential gear train and means for effecting bi-directional rotative output of said differential gear train, is provided to effect bi-directional rotation of the input gear means of the planetary gear train. Interposed between the actuator means and planetary gear train is a no-back, bi-directional brake which rotatively interconnects the input gear means of the planetary gear train with the output of the differential gear train and also functions to lock the planetary gear train to the rotor and prevent transmission of blade torque loads to actuator means during steady state operation when no blades pitch-change is being effected.

One feature of this invention is the use of a planetary gear train which is cageless and where the planets are supported in circumferential spaced relationship by free-floating support rings. Such planetary gear train may be of the type disclosed in the U.S. Pat. to Burns, No. 2,944,444 dated July 12, 1960, and Grudin, No. 3,008,355, dated Nov. 14, 1961.

Another feature of the invention is the use of shaft rotation to provide the rotary input for bi-directional rotation of the differential gear train which comprises two sets of planet gears. One set is in mesh with a shaft-driven ring gear and a fixed sun gear while the other set is in mesh with an output ring gear which serves to provide the input for the no-back brake device and a sun gear that is the output of a bi-directional clutch assembly. In the steady state condition of operation, both ring gears are at shaft speed and both sun gears are fixed. When pitch-change is desired, the actuator means, including its bi-directional clutch assembly, is energized to thereby result in rotation of the output sun gear and a speed-up or slow-down of the output ring gear and therefore a corresponding increase or decrease in blade angle or pitch.

BRIEF DESCRIPTION OF THE DRAWINGS

The above and other objectives and advantages of the present invention will appear more fully hereinafter from a consideration of the detailed description which follows when taken together with the accompanying drawings wherein one embodiment of the invention is illustrated and in which:

FIG. 3 is a schematic showing of the variable pitch mechanism of this invention.

DESCRIPTION OF THE PREFERRED EMBODIMENTS

Figure 1:
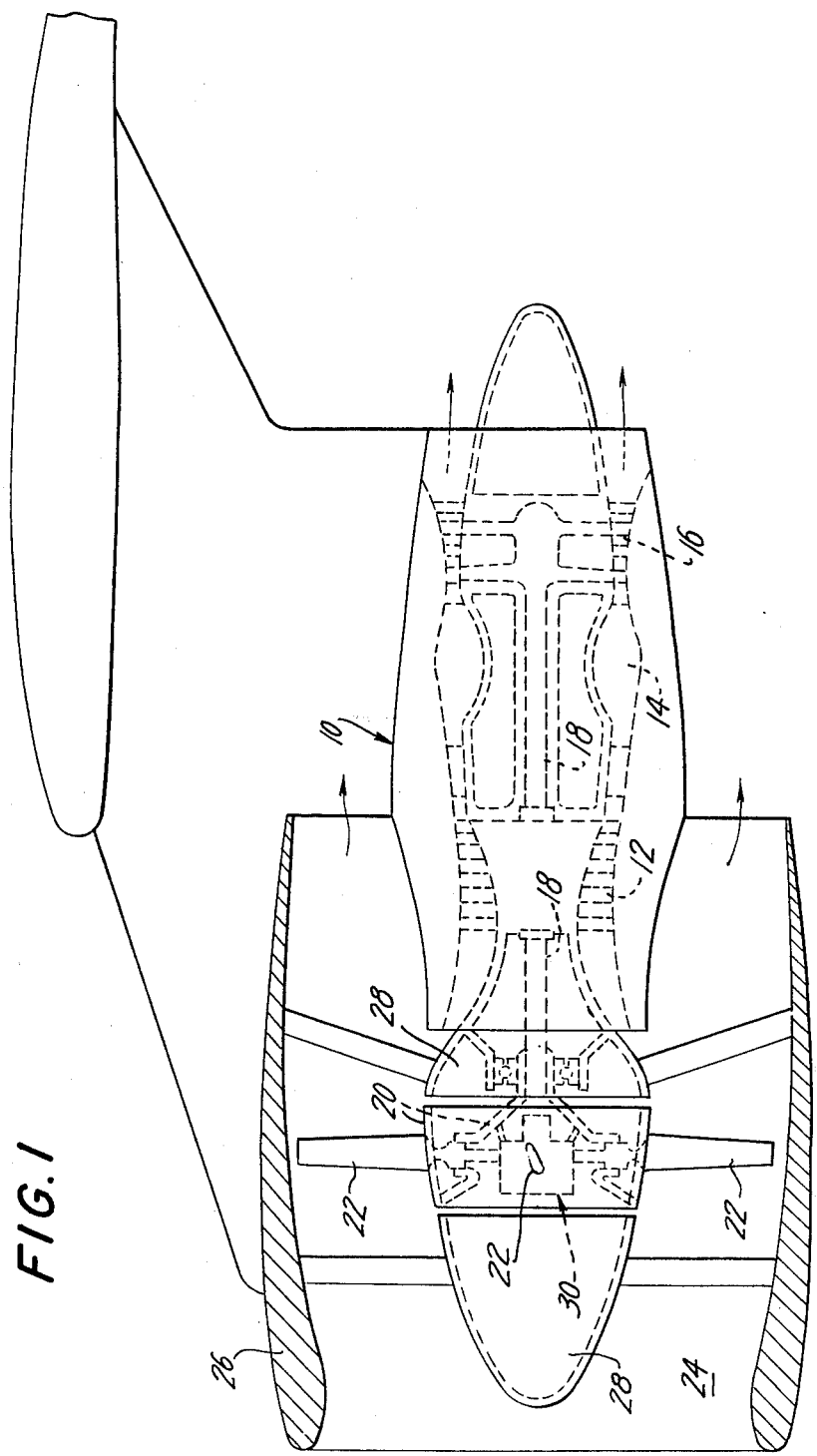
FIG. 1 is a diagrammatic view of a gas turbine engine having a variable pitch mechanism according to the invention for adjusting the fan blades of the gas turbine engine.

Now referring to the drawings, and more particularly to FIG. 1, the reference number 10 generally designates a ducted fan gas turbine engine which may be employed, as shown, to propel an aircraft. The engine 10 is shown as provided with a pitch varying mechanism 30 according to this invention but it is to be understood that mechanism 30 may be employed in other rotary machines having fans or propeller blades for displacing fluids, liquids or gases, and fluidized solids without departure from the scope and spirit of this invention.

GAS TURBINE ENGINE

The engine 10 comprises a compressor section 12, a combustion section 14 and a gas turbine section 16. The compressor section 12 receives and compresses air which discharges into combustion section 14. Fuel is introduced into the combustion section where it burns to produce combustion gases which are passed into and through the gas turbine section 16. The blades of gas turbine section 16 are connected to a drive shaft 18 to rotatively drive the latter which, in turn, drives compressor section 12 and/or rotor 20. The rotor 20 carries a plurality of radially extending, circumferentially spaced fan blades 22 which extend into an annular air passage 24 formed between a duct 26 and fixed centerbody 28. The fan blades 22 are each supported in rotor 20 for rotative movement about their respective longitudinal axes to effect a change in pitch or angle of attack with respect to the air flow through annular passage 24. The means 23 for rotatively supporting each fan blade 22 may be of any suitable type, one such type is shown in FIG. 2A and disclosed in the U.S. Pat. Nos. to Chillson, 2,538,352, dated Jan. 16, 1951 and to Mergen, 2,650,864, dated Sept. 1, 1953. To effect rotative movement of each fan blade 22 and thereby vary the pitch of fan blades 22, the pitch varying mechanism 30 according to this invention is provided.

PITCH VARYING MECHANISM

Figure 2:
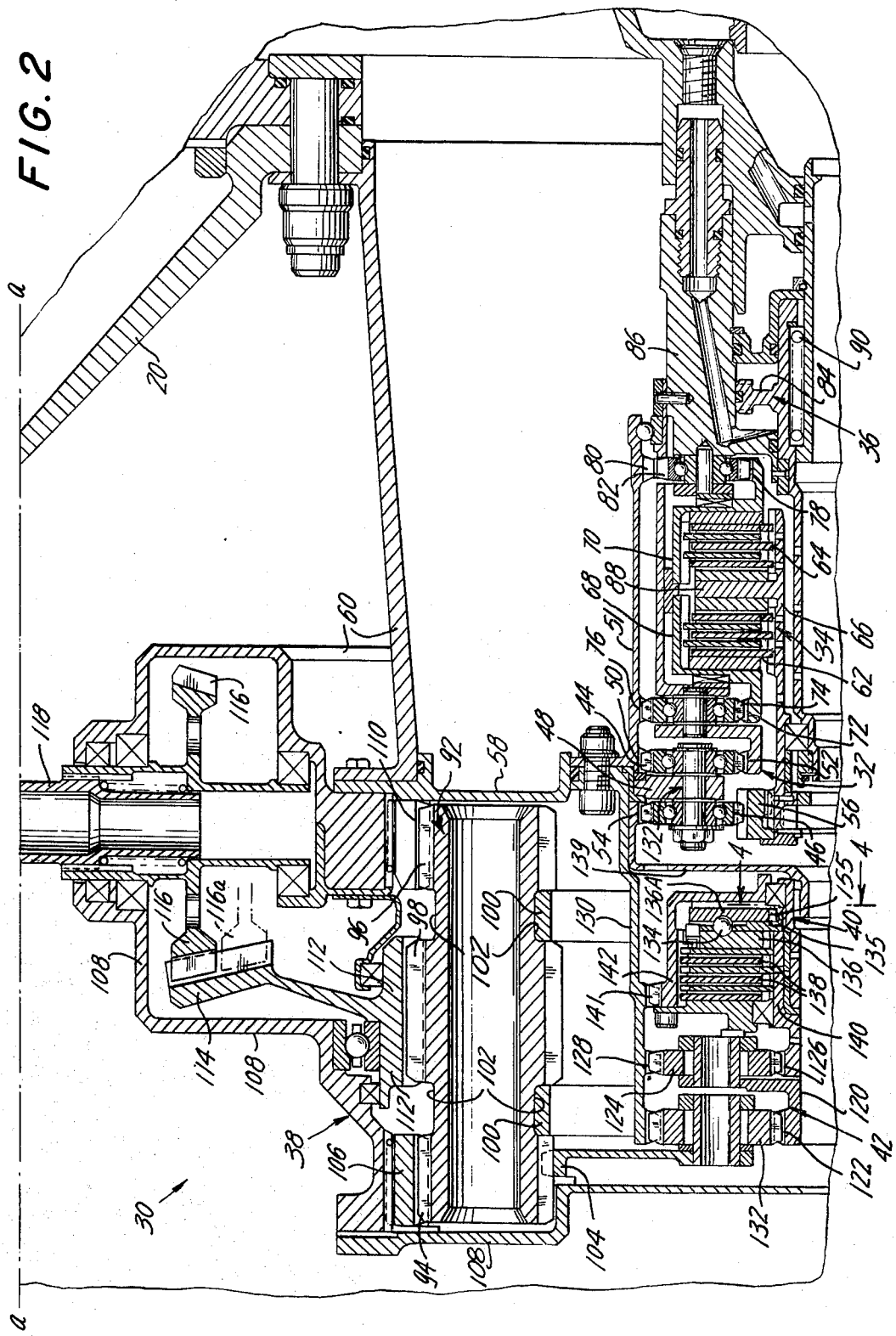
FIG. 2 is a cross-sectional view of part of the variable pitch mechanism schematically shown in FIG. 1 joined to FIG. 2A on line a—a.
Figure 2A:
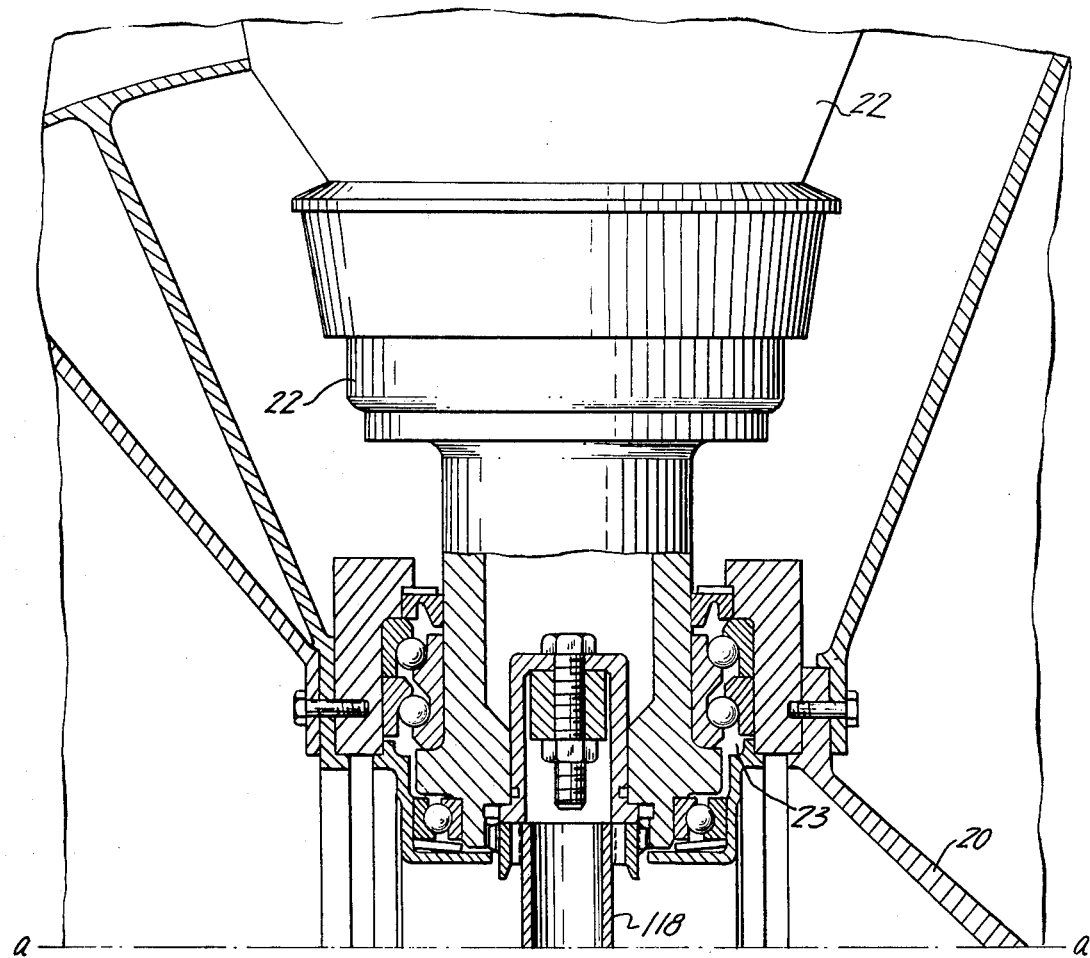
FIG. 2A is a cross-sectional view of another part of the variable pitch mechanism joined to FIG. 2 on line a—a.

As best shown in FIGS. 2 and 3, pitch varying mechanism 30 comprises basically a gear train means 32 for providing rotative output in two direction, a bi-directional clutch means 34 rotatively connected to the drive shaft 18 and gear train means 32 as well as to fixed centerbody 28, an energizing means 36 for selectively actuating bi-directional clutch means 34, a planetary gear train means 38 connected to each fan blade to rotate the latter, and a bi-directional, no-back, clutch-brake 40 connected to gear train means 32 to transmit output rotation of gear train means 32 to the planetary gear train means 38 and thereby effect pitch-change of fan blades 22 and prevent transmission of the torque load on the fan blades to gear train means 32. The system may also include a speed reduction gear train subassembly 42 drivably interposed between clutch-brake 40 and planetary gear train means 38.

DIFFERENTIAL GEAR TRAIN

The gear train means 32 is a differential gear train type comprising, as shown in FIGS. 2 and 3, two sets of planet gears 44 and 46 which are mounted on a carrier 48. The planet gears 44 are disposed in meshing relationship with an internal ring gear 50 and a sun gear 52, while planet gears 46 are in mesh with an internal ring gear 54 which is the input of clutch-brake 40 and a sun gear 56 which is the output of bi-directional clutch means 34. The ring gear 50 is part of a housing wall 51 and is connected, through rear plate 58 and rear housing section 60, to rotor 20 and therefore, in the steady state condition of operation where no pitch-change is being effected, ring gears 50 are at the speed of drive shaft 18 while sun gears 52 and 56 are fixed against rotation, with sun gear 52 functioning as a reaction gear during the pitch-change mode of operation. To effect differential rotation of planet gears 44 and 46 and thereby rotation of ring gear 54 in one direction or the other, bi-directional clutch means 34 is provided.

BI-DIRECTIONAL CLUTCH

The bi-directional clutch means 34 may, as shown, comprise a disk or plate-type clutch having two sets of plates 62 and 64. The plate 62 comprises axially arranged side-by-side plates with alternate plates spline-connected to an output cylinder 66 which is connected to sun gear 56 for conjoined rotation with the latter. The other plates are spline-connected to a first input member 68. Similarly to plate set 62, plate set 64 comprises axially arranged, side-by-side plates with alternate plates spline-connected to output cylinder 66 while the other plates are spline-connected to a second input member 70. Each of the first and second input members 68 and 70 are connected to rotor 20 through a planet gear train. The first input member 68 has a sun gear 72 which meshes with planet gears 74, the outer ring gear 76 being also part of housing wall 51 and therefore rotatively connected to rotor 20. Since planet gears 74 are journaled in a fixed cage of which sun gear 52 forms a part, rotor rotation is transmitted to planet gears 74 by ring gear 76 and results in rotation of sun gear 72. Thus, upon compression of plate set 62, rotation of output cylinder 66 and sun gear 56, at a speed different from rotor speed, is achieved. With the rotation of planet gears 46 by sun gear 56 relative to planet gears 44 and fixed sun gear 52 serving as a reaction gear, ring gear 54 is rotated in one direction. The second input member 70, similar to first input member 68, is rotatively driven by rotor 20. The gear train for second input member 70 consists of planet gears 81 (only shown in FIG. 3) which mesh with ring gear 80 (forms part of housing wall 51) through idler gears 82. Rotation of planet gears 81, through idler gears 82, effect rotation of sun gear 78 which, in turn, rotates second input member 70 but in a direction opposite first input member 68. Thus, when plate set 64 is compressed, the rotation of second input member 70 is transmitted to output cylinder 66 and output sun gear 56. This rotation of sun gear 52 results in rotation of ring gear 54 as previously described, but in the opposite direction. To actuate selectively plate sets 62 and 64 of bi-directional clutch means 34, cooperatively associated therewith is provided energizing means 36.

CLUTCH ENERGIZING MEANS

Energizing means 36 may comprise, as shown, a fluid motor in the form of a fixed piston-cylinder mechanism having a piston 84 positioned in a cylinder 86 for axial reciprocative movement. The piston 84 is suitably secured at one end to output cylinder 66 so that movement of piston 84 linearly and axially moves output cylinder 66 and, through the pressure plates 88, squeezes the plates of plate set 62, or the plates of plate set 64, together. This compression of plate sets 62 or 64 rotatively couples output cylinder 66 to either first input member 68 or second input member 70. The piston 84 is shown in a neutral position so that a spring 90 is effective to return the piston to such neutral position after movement in either direction to engage plate set 62 or plate set 64.

The energizing means 36 also includes control means (not shown) for controlling pressurized fluid such as oil to flow into cylinder 86 for reciprocative actuation of piston 84 to one direction or the other as well as feedback controls (not shown), both of which controls may be any suitable type well known to those skilled in the art.

PLANETARY GEAR TRAIN

In order to save weight and space, the planetary gear train means may be of any suitable type having an input gear means and an output gear means such as disclosed in the U.S. Pat. Nos. to McMurtry et al, 3,825,370 dated July 23, 1974; Burns, 2,944,444, dated July 12, 1960; Grudin, 3,008,355, dated Nov. 14, 1961; Bennett et al., 3,258,995, dated July 5, 1966; and Leiner et al, 3,640,150, dated Feb. 8, 1972. Preferably, planetary gear train means 38 is of the cageless, balanced, compound planetary gear transmission type such as disclosed in the aforesaid Grudin patent.

As shown in planetary gear train means 38 comprises a plurality of planet members 92, each of which have three pinion gears 94, 96 and 98. The planet members 92 are held in circumferential spaced relation to each other by free-floating rings 100 (See FIG. 2) which seat within annuli 102 in each planet member 92. The pinion gears 94 at the end of each planet member 92 is disposed in mesh with a sun ring gear 104 which is the output of speed reduction gear train 42 and in mesh with an internal ring gear 106 which is secured to rotate with rotor 20 via front housing section 108 and rear housing section 60. The pinion gear 96 at the other end of each planet member 92 is in mesh with an internal ring gear 110 which, similar to ring gear 106, is fixed to rotor 20 by way of front housing section 108 and rear housing section 60. The central pinion gear 98 is the output of the planetary gear train means 38, and it meshes with an output internal ring gear 112 which is integral with a bevel bull gear 114. The bull gear 114 is, in turn, in meshing relation with a plurality of bevel blade gears 116, one for each blade 22. Each bevel blade gear 116 is connected to a shaft quill 118, the opposite end of which is connected to a blade 22 to transmit rotary motion to the latter (see FIG. 2A). To permit relatively large diameter bevel blade gears 116, the bevel gears engage bull gear 114 in staggered relation to each other as illustrated by the second bevel blade gear 116A shown in broken lines in FIG. 2 and full line FIG. 3.

In operation of planetary gear train means 38, rotation of sun ring gear 104 transmits rotation to pinion gear 94 of planet members 92 causing the planet members 92 to rotate relative to ring gears 106 and 110 which serve as reaction gears. The resultant rotation of output pinion gear 98 effects rotation of bull gear 114, which, in turn, rotates blade bevel gears 116 and 116A. The rotation of bevels gears 116 and 116A causes rotation of the associated quill shaft 118 about its longitudinal axis. Since each of the quill shafts 18 is connected to a blade 22, the blades are rotated to change their angle of attack or pitch-angle.

SPEED REDUCTION GEAR TRAIN

The speed reduction gear train sub-assembly 42 of which sun ring gear 104 is the output gear, may comprise, as shown, a conventional two-stage planetary gear train in which the planetary gear carrier 120 of one stage drives the sun gear 122 of the second stage. The planetary gear carrier 120 supports a first set of planetary gears 124 in mesh with a sun gear 126 which is the output gear of bi-directional, no-back, clutch-brake 40 and an internal ring gear 128 which is secured to rotor 20 via gear ring 130, rear plate 58 and rear housing section 60. A second set of planetary gears 132 are supported on a carrier which has integral therewith output sun gear 104.

CLUTCH-BRAKE

The variable pitch mechanism 30 in accordance with this invention provides a bi-directional, no-back, clutch-brake 40 disposed in the mechanism to isolate gear train means 32 and bi-directional clutch means 34 from the feedback blade torque loads incurred by the blades during steady state operation. This prevention of transmission of blade torque loads minimizes recirculated power losses and eliminates the need for a separate brake mechanism coacting with bi-directional clutch means 34. The clutch-brake 40 may be of any suitable type which is capable of transmitting rotation in two directions of rotation, but brakes or locks to prevent feedback or reverse transmission of torque in either directions of rotation.

Figure 4:
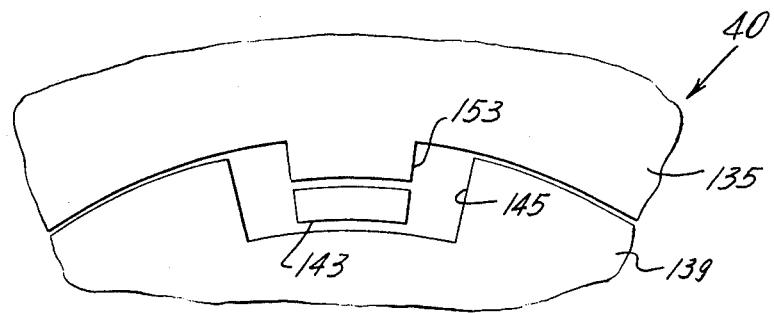
FIG. 4 is a fragmentary sectional view taken substantially along line 4—4 of FIG. 2.

As shown for illustration purposes, clutch-brake 40 may be of the ball-ramp-disk type which comprises a plurality of balls 134 (only one of which is shown) circumferentially spaced from each other and supported in a carrier plate 135, two ramp plates 136 and 136A and a set of brake plates 138. The brake plates 138 are arranged with alternate plates spline-connected to inner housing assembly 140 which has, as an integral part thereof sun gear 126, and the other brake plates being spline-connected to an outer housing assembly 142 which is secured at 141 to rotor 20 via gear ring 130, rear plate 58 and rear housing section 60. When input ring gear 54, which has a cylindrical extension 139 rotatively connected to inner housing assembly 140 through a loose tongue and groove connection, is rotated in either direction, inner housing assembly 140 is rotated which is transmitted to sun gear 126 to thus drive speed reduction gear sub-assembly 42. This direct drive, through housing assembly 140, is achieved as best shown in FIG. 4 by reason of the tongue and groove connection consisting of a set of radial extending lugs 153 on carrier plate 136A which engages groove walls 145 in the cylindrical extension 139 of ring gear 54 and thereby aligns the rampl plates and carrier plate 135 so that brake plates 138 are unloaded. In a backward or reverse driving condition, the output ramp plate 136, which is spline-connected to inner housing assembly 140, is rotated relative to input ramp plate 136 which angular displacement causes axial loading of brake plates 138 as the balls 134 ascend the inclined ramp surfaces (not shown) of the ramp plates 136 and 136A thereby locking inner housing assembly 140 to rotor 20. This, thus, prevents the transmission torque loads on blades 22 from being imposed on the constantly rotating elements of the bi-directional gear train means 32 and bi-directional clutch means 34 so that these elements or additional devices need not be provided to absorb those torque loads. A wave washer and disk (not shown) produce a drag torque on the input ramp plate 136A during braking. This drag torque also provides a limited braking action on the ouput cylinder 66 of bi-directional clutch means 34, via bi-directional gear train means 32, to hold against clutch disk drag rotation.

SUMMARY OF OPERATION

In summary, pitch varying mechanism 30 operates in the following manner, the description of which may be better understood by reference to FIG. 3. In the steady-state mode of operation, bi-directional clutch means 34 is in a null or neutral position and the planetary gears 44 and 46 of gear train means 32 move around their respective fixed sun gears 52 and 56. With sun gears 52 and 56 fixed, no rotation is imparted by planetary gears 46 to input ring gear 54. Accordingly, no rotative torque is transmitted to clutch-brake 40, speed reduction gear train sub-assembly 42, planetary gear train means 38 and blades 22. When change of blade pitch is required or initiated, pressurized fluid is conducted to cylinder-piston mechanism of energizing means 36 so as to linearly actuate piston 84 either to the right or left as viewed in FIGS. 2 and 3, depending upon whether pitch-change requirements dictate increasing or decreasing the pitch. Assuming that piston 84 is indexed to the left as viewed in FIG. 3, such movement effects lock-up of plate set 62 of bi-directional clutch means 34. This plate set lock-up transmits rotor rotation (drive shaft speed) to output cylinder 66 and output gear 56, but at a different speed. This causes planetary gears 46 to rotate or planetate at a different rate then planetary gears 44 and by reason of fixed reaction gear 52, ring gear 54 is rotated. The rotation of ring gear 54 rotates inner housing assembly 140. Since housing assembly 140 has a gear 126 which serves as a sun gear for speed reduction gear train sub-assembly 42, planetary gears 124 are rotated about their axes, the internal ring gear 128 rotating at rotor speed serving as a reaction gear. The planetation of planetary gears 124 rotates its carrier 120 which has an integral sun gear 122 that is thereby rotated. This rotation is transmitted to planet members 92, via planetary gears 132 and ring gear 104. With pinion gears 94 and 96 engaging ring gears 106 and 110 which are rotating at the speed of rotor 20, and therefore serving as reaction gears, rotation of pinion gear 94 rotates planet members 92 about their axes thus effecting rotation of output pinion gear 98 and bevel bull gear 114. The rotative movement is then transmitted to bevel gears 116 and 116A, which in turn, rotate quill shafts 118 and blades 22.

Blade pitch-change in the opposite direction is achieved in the same manner except that plate set 64 is locked-up instead of plate set 62 by movement of piston 84 so that output cylinder 66 and output sun gear 56 are rotated in the opposite direction. The engagement of plate set 64 effects this opposite rotative movement of sun gear 56 by transmitting the drive shaft rotary power through rotor 20 and idler gears 81 and planet gears 82 to second input member 70 of bi-directional clutch 34. The remainder of rotary transmission is the same as previously described.

It is believed now readily apparent that the present invention provides a variable pitch mechanism for fan blades which mechanism is compact, light in weight, yet having the required torque transmitting capability. It is a mechanism which achieves a high level of efficiency since it minimizes power losses.

Although but one embodiment of the invention has been illustrated and described in detail, it is to be expressly understood that the invention is not limited thereto. Various changes can be made in the arrangement of parts without departing from the spirit and scope of the invention, as the same will now be understood by those skilled in the art.

We claim:

1. A pitch varying mechanism for a variable pitch fan in which a plurality of fan blades are supported in a rotor for rotative movement about their longitudinal axes and in which a drive shaft is provided for rotatively driving the rotor so that the fan blades are carried in a rotative path, the mechanism comprises, in combination:
    a. gear train means for providing output rotation in two directions;
    b. bi-directional clutch means rotatively connected to the drive shaft, a fixed structure and the gear train to provide the latter with rotational output alternately in one direction and the other;
    c. energizing means for selectively actuating the bi-directional clutch means to effect output rotation of the gear train means in a predetermined direction;
    d. a cageless planetary gear train comprising a plurality of ring gears meshing with a plurality of planets arranged concentrically of the drive shaft axis and radially outwardly of the bi-directional clutch means and the gear train means and connected to each of the fan blades to rotate the latter and change their pitch; and
    e. a bi-directional, no-back, clutch-brake connected to the gear train to transmit output rotation of the gear train means to the cageless planetary gear train to effect pitch-change of the fan blades and prevent transmission of the torque load on the fan blades to the gear train means during steady state operation when no blade pitch-change is being effected.

2. The apparatus of claim 1 wherein said gear train means is of the differential type with one part connected to a fixed structure and another part rotatively driven by the drive shaft when the bi-directional clutch means is energized.

3. The apparatus of claim 1 wherein each of said fan blades has a shaft quill and a bevel gear attached thereto and wherein one of said ring gears of the cageless planetary gear train has a bevel bull gear in mesh with each of said bevel gears to rotate the fan blades.

* * * * *